United States Patent [19]

Hollyday et al.

[11] Patent Number: 5,002,017
[45] Date of Patent: Mar. 26, 1991

[54] BIRD WATERING DEVICE

[75] Inventors: Thomas J. Hollyday, Weston; Michael Platsidakis, Foxboro; David H. Helinek, Framingham, all of Mass.

[73] Assignee: Holly Corporation, Weston, Mass.

[21] Appl. No.: 355,780

[22] Filed: May 22, 1989

[51] Int. Cl.$^5$ .............................................. A01K 7/00
[52] U.S. Cl. ...................................... 119/73; 119/61
[58] Field of Search ................. 119/61, 63, 73, 74, 119/77, 72

[56] References Cited

U.S. PATENT DOCUMENTS

| | | | |
|---|---|---|---|
| 443,446 | 12/1890 | Kouns | 119/73 X |
| 1,150,877 | 8/1915 | Olson | 119/73 |
| 2,446,695 | 8/1948 | Didget | 119/74 |
| 4,221,188 | 9/1980 | Hostetler | 119/72 |
| 4,426,956 | 1/1984 | McKinstry | 119/72 |

FOREIGN PATENT DOCUMENTS 6702 of 1890 United Kingdom ................. 119/61

Primary Examiner—Robert P. Swiatek
Assistant Examiner—Todd E. Manahan

[57] ABSTRACT

The bird watering device utilizes solar energy to maintain drinking water in an unfrozen state even in freezing temperatures. Water is held in a shallow tray which fits within an enclosing dish with a substantial closed airspace between the tray and the dish to provide an insulating effect. A cover fits over the disk and tray, the cover being apertured to permit a bird access to water held in the tray. A rim extends downwardly from the aperture to substantially obstruct air circulation of air in the space between the cover and water held in the tray.

7 Claims, 1 Drawing Sheet

U.S. Patent  Mar. 26, 1991  Sheet 1 of 1  5,002,017
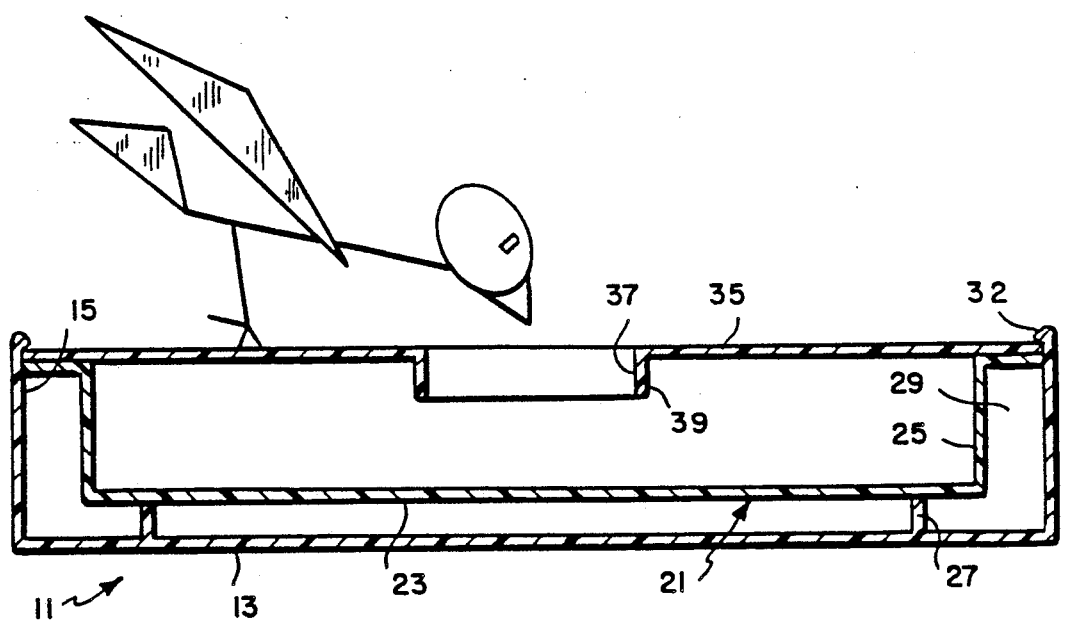

BIRD WATERING DEVICE

BACKGROUND OF THE INVENTION

The present invention relates to bird watering devices and more particularly to such a device which will maintain water in an unfrozen state even in freezing environments. In winter, the finding of drinkable water may be as much of a problem for wild birds as the finding of food. Many natural water sources will either freeze solid or be covered with ice so thick that access is prevented. While nature lovers commonly think to provide sources of food for wild birds, it is seldom that drinkable water is made available. While food may be easily set out e.g. in a suitable feeder station, the maintaining of unfrozen water in subfreezing temperatures has been a somewhat more onerous task. While it has heretofor been proposed to provide electrically heated watering stations, these have not found any appreciable use, presumably due to the inconvenience and cost of providing electric power out-of-doors.

SUMMARY OF THE INVENTION

A cold weather bird watering device constructed in accordance with the present invention employs a round water tray which is adapted to fit within a similar but larger dish, with a substantial closed air space being provided between the tray and dish. A circular, generally flat cover fits over the dish and the tray and the cover is provided with an aperture which permits access by a bird to water held in the tray. Preferably, a rim extends downward from the periphery of the aperture for substantially restricting air circulation in the space between the cover and water held in the tray.

Among the several objects of the present invention may be noted the provision of a bird watering device which will maintain water in a liquid state even in freezing temperatures; the provision of such a device and install, which is highly efficient, which is reliable, and which is of relatively simple and inexpensive construction. Other objects and features will be in part apparent and in part pointed out hereinafter.

BRIEF DESCRIPTION OF THE DRAWING

The single FIGURE is a side view, in section, of a bird watering device constructed in accordance with the present invention.

DESCRIPTION OF THE PREFERRED EMBODIMENT

Referring now to the drawing, the bird watering device illustrated there is assembled from three components each of which may be easily manufactured from a suitable plastic resin e.g. by injection molding An outer dish is designated generally by reference character 11 and this dish element includes a circular bottom panel 13 and a circumferential side wall 15.

Fitting within the dish 11 is a round water tray designated generally by reference character 21. The water tray comprises a circular bottom panel or portion 23 and a circumferential side wall 25. The tray 21 is, however, somewhat smaller than the dish 11 so that there exists a substantial air space between the respective bottom portions and between the respective circumferentials side walls. At the bottom, this air space is maintained by an annular ridge 27 extending upwardly from the bottom panel 13. A rim 29 extending outwardly from the upper edge of the side wall 25 maintains centering of the tray proper within the dish 11 so as to maintain a suitable insulating airspace air space between the respective sidewalls. If desired, the bottom of the tray may be provided with an upwardly extending tab which may be grasped to facilitate removal of the tray 21 from the dish 11.

Water may be held within the tray 21. A circular, generally flat cover 35 fits over the dish and the tray. Cover 35 is provided with an aperture 37 which permits access by a bird to water held in the tray. The aperture 37 exposes a minor portion of the surface area of the water held in the tray and a rim 39 extending downwardly from the periphery of the aperture substantially restricts air circulation in the space between the cover and any water held in the tray.

As will be understood by those skilled in the art, the exposed water surface represents a source of heat loss from the water held in the tray and, for the device of the present invention to fulfill its purpose, this heat loss must be constrained so as to be less than the heat available from solar input. Thus, in the context of the present invention, the term "minor" with respect to the exposed portion of the water surface should be understood to mean in the order of 5% of the water surface.

To provide solar heating of the water within the tray 21 either the tray 21 or the cover 31 is constructed so as to be as light absorbing as possible, particularly in the infrared region. As is understood, this can be done by blackening the surface of the element or by incorporating suitable absorbers e.g. carbon black, within the plastic material from which the element is constructed. If the tray is designed to be the principal light absorbing element, the cover 31 is preferably made as transparent as possible to the wavelengths of interest. To minimize heat loss from the tray through the dish 11, the outer surface of the tray may be aluminized or otherwise silvered so as to reduce its infrared emissivity.

To hold the elements in assembled relationship as illustrated, the upper end of the circumferential wall 15 preferably includes an inwardly extending shallow lip as indicated by reference 32, the compliance of the circumferential wall being sufficient to permit the tray and the cover to be snapped into position and to be releasably held there until such time as it is desired to clean the interior of the device.

In view of the foregoing, it may be seen that several objects of the present invention are achieved and other advantageous results have been obtained.

As various changes could be made in the above constructions without departing from the scope of the invention, it should be understood that all matter contained in the above description or shown in the accompanying drawing shall be interpreted as illustrative and not in a limiting sense.

What is claimed is:

1. A cold weather bird watering device comprising:
    a shallow round dish molded of plastic resin and having a bottom portion and a circumferential side wall;
    a shallow round water tray having at its upper edge an outwardly projecting rim and molded of plastic resin and having a bottom portion and a circumferential side wall, said tray being adapted to fit within said dish with a substantial air space between the respective bottom portions and with a substantial air space between the respective side walls, said air spaces being closed off from the environment; and a circular, generally flat cover molded of plastic resin which fits over said dish and said tray and contacts said annular rim, said cover being provided with an aperture which permits access by a bird to water held in said tray, said aperture exposing only a minor portion of the surface of water held in said tray, there being a rim which extends downwardly from the periphery of said aperture for substantially restricting air circulation in the space between said cover and water held in said tray.

2. A bird watering device as set forth in claim 1 wherein said cover is transparent and said tray is highly light absorbing.

3. A cold weather bird watering device comprising:
a shallow round dish molded of plastic resin and having a bottom portion and a circumferential side wall;
a shallow round water tray molded of plastic resin and having a bottom portion and a circumferential side wall, said tray being adapted to fit within said dish, said dish having an upwardly projecting ridge which establishes a substantial air space between the respective bottom portions of said dish and said tray, said tray having an outwardly projecting annular rim which establishes a substantial air space between the respective side walls of said dish and said tray, said air spaces being closed off from the environment; and
a circular, generally flat cover molded of plastic resin which fits over said dish and said tray and contacts said annular rim, said cover being provided with an aperture which permits access by a bird to water held in said tray, said aperture exposing only a minor portion of the surface of water held in said tray, there being a rim which extends downwardly from the periphery of said aperture toward the bottom portion of said tray.

4. A bird watering device as set forth in claim 3 wherein said cover is transparent and said tray is highly light absorbing.

5. A bird watering device as set forth in claim 3 wherein said cover is highly light absorbing.

6. A bird watering device as set forth in claim 3 wherein the area of said aperture is in the order of 5% of the area of said cover.

7. A cold weather bird watering device comprising:
a shallow round dish molded of plastic resin and having a bottom portion and a circumferential side wall;
a shallow round water tray molded of plastic resin and having a bottom portion and a circumferential side wall, said tray being adapted to fit within said dish, said dish having an upwardly projecting ridge which establishes a substantial air space between the respective bottom portions of said dish and said tray, the upper portion of the circumferential wall of said tray having an outwardly projecting annular rim which establishes a substantial closed air space between the respective side walls of said dish and said tray, said air spaces being closed off from the environment; and
a circular, generally flat cover molded of plastic resin which fits over said dish and said tray, said cover being provided with an aperture which permits access by a bird to water held in said tray, said aperture exposing only a minor portion of the surface of water held in said tray, there being a rim which extends downwardly from the periphery of said aperture toward the bottom portion of said tray, the upper portion of the circumferential side wall of said dish having means projecting inwardly for engaging said cover and the outwardly projecting rim of said tray thereby to releasably retain said cover and said tray in said dish.

* * * * *